United States Patent [19]
Kashioka et al.

[11] Patent Number: 4,783,831
[45] Date of Patent: Nov. 8, 1988

[54] METHOD FOR PRODUCING A STANDARD PATTERN FOR PATTERN MATCHING

[75] Inventors: Seiji Kashioka, Hachioji; Yoshihiro Shima, Kodaira; Takafumi Miyatake, Hachioji; Masakazu Ejiri, Tokorozawa, all of Japan

[73] Assignee: Hitachi, Ltd., Tokyo, Japan

[21] Appl. No.: 777,724

[22] Filed: Sep. 19, 1985

[30] Foreign Application Priority Data

Sep. 19, 1984 [JP] Japan .................. 69-194670

[51] Int. Cl.⁴ .............................................. G06K 9/00
[52] U.S. Cl. ........................................ 382/34; 382/14; 382/27
[58] Field of Search ............. 382/19, 25, 27, 30, 382/34, 14

[56] References Cited

U.S. PATENT DOCUMENTS

| | | | |
|---|---|---|---|
| 3,541,511 | 11/1970 | Genchi et al. | 382/25 |
| 4,021,778 | 5/1977 | Ueda et al. | 382/30 |
| 4,091,394 | 5/1978 | Kashioka et al. | 382/22 |
| 4,429,414 | 1/1984 | Asakawa | 382/30 |
| 4,435,835 | 3/1984 | Sakow et al. | 382/34 |
| 4,441,205 | 4/1984 | Berkin et al. | 382/8 |

Primary Examiner—Leo H. Boudreau
Attorney, Agent, or Firm—Antonelli, Terry & Wands

[57] ABSTRACT

This invention provides a method and apparatus for automatically producing a standard pattern for local pattern matching. According to the present invention, local patterns equivalent in size to a standard pattern to be obtained are successively removed from the image of an object being examined to prepare standard pattern candidates. Evaluation values representing appropriateness as a standard pattern are obtained from the local patterns successively removed or the local patterns together with the image of the object being examined. The evaluation values are used in an evaluation function expressing the uniqueness of the standard pattern and in an auxiliary evaluation function as an aid to the former. The standard pattern is selected using such evaluation values.

9 Claims, 5 Drawing Sheets

METHOD FOR PRODUCING A STANDARD PATTERN FOR PATTERN MATCHING

BACKGROUND OF THE INVENTION

This invention relates to a method for automatically producing a standard pattern covesponding to different kind of objects, for an object recognizing system utilizing image processing, and particularly to pattern matching.

U.S. Pat. No. 4,091,394 1983 discloses a method of detecting the position of an object using the shape or the pattern existing on the surface thereof. This method is extensively used for assembling transistors, ICs, LCs, LSIs, etc. This method has two stages. The first stage has previously stored characteristic local patterns of an object and the second stage finds the position of the pattern from the supplied image of the object. In this method, the number of points constituting a standard pattern can be made a minimum, by using only a local pattern of an object as the standard pattern, so that a dedicated fast processing circuit of a practical scale may be constructed. However, an important problem is which one of the local patterns should be selected as a standard pattern to implement the method, and it must be decided whether or not a standard pattern is unique. In other words, the selected standard pattern should be such pattern that no similar patterns appear in the picture except for it.

The aforesaid selection relies on human intuition using an apparatus such as that disclosed in Japanese Patent Laid-Open No. 144343/1975. However, because there is difficulty when there are many kinds of objects to be processed, which requires skilled labor, automated operation has been desired.

SUMMARY OF THE INVENTION

An object of the present invention is to provide a method and apparatus for effectively automatically selecting a standard pattern for local pattern matching.

In order to attain this object, the method according to the present invention comprises the steps selecting and storing in a memory a local pattern, equivalent in size to a standard pattern to be obtained, from the image of an object being examined and making it a standard pattern candidate, making the local pattern a standard pattern candidate and obtaining the minimum of matching errors between the value representing its aptitude as a standard pattern by refering local patterns successively selected and stored from of the whole image of the object being examined. As the evaluation value, an evaluation function represents the uniqueness of the standard pattern and an auxiliary evaluation function for supplementing the function above.

(1) Evaluation function:

The evaluation function is defined by the minimum in the matching errors between a standard pattern candidate and portions within the image other than the portion which corresponds to the standard pattern candidate. Standard patterns are selected from those patterns whose minimum matching error are greater.

(2) Auxiliary evaluation function:

The auxiliary evaluation function screens the standard pattern candidates before obtaining the above evaluation function. The following four kinds of functions are useful:

(i) White pixel ratio;

This evaluation value shows whether or not the percentage of white pixels within the standard pattern candidate is close to 50%.

(ii) Simple pattern ratio;

This evaluation value shows whether or not the number of unit patterns without boundaries within the standard pattern candidate is at least as large as what has been predetermined.

(iii) Boundary length;

This evaluation value shows whether or not the mean boundary length of the unit pattern existing in the standard pattern candidate is within a predetermined range.

(iv) Orthogonal element;

This evaluation value shows whether or not the number of unit patterns within the standard pattern candidate having an oblique boundary of two directions is larger than what has been predetermined on the number of unit patterns within the standard pattern candidate having a horizontal and vertical boundary is larger than what has been predetermined.

The standard pattern is determined according to the aforementioned evaluation values.

DESCRIPTION OF THE PREFERRED EMBODIMENT

The present invention is a process comprising analyzing the reason for which error matching is caused, obtaining conditions under which the error matching is prevented so as to provide an evaluation function representing the uniqueness of a standard pattern and further an auxiliary evaluation function of shortening the processing time required for selecting the standard pattern.

Prior to describing embodiments of the present invention, there is provided a definition of local pattern matching.

Each of the sampling points of a sampled image is known as a picture element. When the number of picture elements constituting an image in the form of a binary value is a M X M matrix of M vertical elements and M horizontal elements with coordinates (X, Y), the value of the image at the coordinates (X, Y) is assumed P (X, Y), where P(X, Y)=0 or 1; $1 \leq X \leq M$, and $1 \leq Y \leq M$. When the number of picture elements of the standard pattern is a N X N matrix of N vertical elements and N horizontal elements with coordinates (i, j) and the value at coordinates (i, j) being T(i, j), T(i, j)=0 Or 1, the following is established:

$$-[N/2] \leq i \leq [(N-1)/2], -[N/2] \leq j \leq [(N-1)/2] \quad (1)$$

Assuming that a local pattern is extracted from the compressed image sampled vertically and horizontally out of a binary image on a K picture element basis, a first sampling point, that is, the sampling phase is given as $\xi, \eta$. With $0 \leq \xi \leq K-1$, $0 \leq \eta \leq K-1$, the coordinates (X, Y) of the sampling point will satisfy the following equation:

$$X = K \cdot x + \xi, Y = K \cdot y + \eta$$

where x, y are the coordinates in the image sampled. As a result, the coordinates of the picture element can be expressed with (x, y, $\xi$, $\eta$) in place of (X, Y).

Although the size M of the image, the size N of the standard pattern and the spacing K of sampling have been assumed to be of the same value both vertically and horizontally for simplicity other assumptions do not nullify the generality of the following discussion.

The matching error E of a local pattern whose number of picture elements N X N with a standard pattern with a given point (X, Y)=(x, y, $\xi$, $\eta$) as the center is defined as $$E(X, Y) = E(x, y, \xi, \eta) = \qquad (2)$$
$$\Sigma P(x + i, y + j, \xi, \eta) \oplus T(i, j) ji$$

In this case, $\oplus$ signifies an addition modulo 2 equivalent to an exclusive OR, whereas i, j are assumed movable within the range of the equation (1). The local pattern matching is to obtain a minimum error Em and the coordinates Xm, Ym of the local pattern according to the following equation through the calculation of the equation (2) for the local pattern within the image:

$$Em = \min E(x,y,\xi,\eta) x,y,\xi,\eta = E(xm,ym,\xi,\eta) \qquad (3)$$

The coordinates (Xm, Ym)=(xm, lym, $\xi,\eta$) thus obtained are recognized as a position corresponding to the standard pattern.

If the wrong standard pattern is selected, erroneous matching will occur or the possibility that erroneous matching will occur will be increased.

The erroneous matching in the local pattern matching means that a correct portion corresponding to the standard pattern is not obtained and instead one that differs from that portion is obtained.

The matching error of the equation (2) for a portion corresponding to the standard pattern is called a native position error Ea, whereas the matching error for any portion other than the aforesaid one is called a non-native position error Ec. When the native position error Ea increases and exceeds the non-native position error Ec in any portion within the image, a mismatch will occur. Accordingly, consideration must be given to the fluctuations in both native and non-native position errors.

In particular, because the input image changes depending on the occasion at which the standard pattern is stored or matched is carried, even if the images are obtained by taking pictures of objects of the same kind, the pattern in the portion corresponding to the standard pattern will differ. Consequently, it should be taken into consideration that the native position error naturally should increase.

(i) Revolution of an object. The object in local pattern matching is allowed to slight revolve (for instance, within 10 degrees) around an image input device and this constitutes a cause for an image change. However, such a change is associated with the configuration of the standard pattern and, for instance, a concentric circle pattern is almost unaffected by the revolution, whereas a radial one is greatly affected.

(ii) Sampling error. The quantity of the positional shift of an object relative to an image input device is generally continuous and, since it is not always as large as an integral multiple of the sampling interval, the positional relation of the sampling point to the object varies each time, whereby it is indeterminate whether or point close the boundary is 0 or 1. Solely in view of this, boundary points in the standard pattern should preferably be minimized to suppress an increase in the native position error.

(iii) Changes in binary values. Changes in lighting systems, sensors, video circuits, surface conditions of objects, etc. cause changes in the binary images of objects and there exist no general and practical methods of binary processing usable for always obtaining the same image for all combinations of these objects.

Even if a native position error Ea is thus increase, no erroneous matching will occur when a non-native position error Ec at any of the other portions is large. However, depending on the portion out of which a standard pattern candidate is selected, there may exist another portion where the non-native positio error is small within the picture. Moreover, the non-native position error Ec may decreases as compared with the registered image. In other words, if the minimum value Ecm of the non-native position error Ec in the whole picture is small, erroneous matching potential is large. Accordingly, the minimum value Ecm is deemed as an evaluation function in this case and, as the value is increased, the standard pattern candidate is considered as better and unique. However, if the distribution of the matching error in the position of the standard pattern is not particularly sharp, the minimum value of the non-native position error will occur in the vicinity of that position. Accordingly, the region having a certain width including the position of the standard pattern candidate is omitted from the process of obtaining the evaluation function Ecm. That is, the evaluation function Ecm is defined by the following equation:

$$Ecm = \min_{(X, Y) \in R} E(X, Y) \qquad (4)$$

However, as shown by the following equation, R designates a region excluding the neighborhood of the position (Xo, Yo) of the standard pattern.

$$|X - Yo| > \omega, |Y - Yo| > \omega \qquad (5)$$

($\omega$=maximum distance from the poxition (Xo, Yo) of the standard pattern candidate)

It requires $N^2 M^2$ times calculations of addition and two input exclusive OR operations to obtain a native position error for one standard pattern candidate and, if this process is applied to the standard pattern candidates in the whole picture, $2N^2 M^4$ times calculations will be required. For instance, given that the lenth of one side of a local pattern N=8, sampling spacing K=1 and the length of one side of an image M=256, the number of times of calculations will become $2.4 \times 10^{11}$ and, if a high-speed computer capable of carrying out the process including address calculation for 1 $\mu$s is used, it will take about 67 hours. In the case of a microcomputer, the time required will increase by more than one order of magnitude. Moreover, if a special pattern matching device is used, the time will be about 17 minutes and, because $K^4 = 1/625$ in the cace of K=5, the time will be decreased to 6.5 minutes using the same type of high-speed computer but it is still long. Consequently, the introduction of an auxiliary evaluation function that can be computed using only data within the standard pattern candidate is considered to carry out first selection through computation in the order of $N^2 M^2$. In order to estimate which one of the features is usable, the distribution of matching errors in terms of the standard pattern selected and stored from the image of an actual image and all local patterns selected and stored from the image have been observed. The following are the results indicative of their characteristics.

(1) As there exist wide regions respectively smeared with white and black colors within an original image, the frequency of an error relative to the local pattern (in completely white or black) included in the region is high. When the percentage of the white picture element of the standard pattern candidate is 50, these two frequent errors are piled up and become one, or otherwise they appear in places equally separated from the center. For instance, when the percentage of the white picture element of the standard pattern is 80, the matching error in the completely white portion will be 20%, whereas it will be 80% in the completely black portion. In other words, the completely white portion displays a close correlation with a matching error of 20%. As there exist many white portions on the object, the number of portions in conformity with each other increases and this makes the matching possibility greater. That fact aslo applies to a case where the percentage of the black picture element of the standard pattern becomes close to 100.

(2) When the position and size of the standard pattern candidate in the original image are the same, the matching error dispersion will become roughly similar to each other. In other words, even if N differs but if K X N are the same, the same degree of dispersion will be obtained.

Based on the such an observation, one can obtain the following guideline for selecting a standard pattern.

(1) the percentage of a white picture element in the standard pattern should be close to 50.

(2) In the case of an application wherein N has to be set small because of the apparatus and limited time, sampling should be provided to select the spacing K properly. As a result, an effect rough equivalent to what is available with matching using a large pattern can be maintained.

To obtain the basic characteristic quantity for use as an evaluation function, consideration is given to the use of statistics concerning a 2 X 2 unit pattern. As this unit pattern is composed of four picture elements, there are $2^4 = 16$ kinds. They are classified into six groups $G_1$, $G_{21}$, $G_{22}$, $G_{31}$, $G_{32}$, $G_4$ according to the direction of the boundary line contained in the unit pattern involved.

(1) Group $G_1$ of unit patterns without containing boundary lines:
There are two kinds of unit patterns, one $$\begin{Bmatrix} 00 \\ 00 \end{Bmatrix}$$

of which has 2 ×2 picture elements all set at 0, the other $$\begin{Bmatrix} 11 \\ 11 \end{Bmatrix}$$

having picture elements are set at 1.

These unit patterns in combination will be written as $$G_1 = \begin{Bmatrix} 00 & 11 \\ 00 & , & 11 \end{Bmatrix}$$

(2) Group $G_{21}$ of unit patterns having a right-handedly slanted boundary line:
There are four kinds of unit patterns $$\begin{Bmatrix} 00 \\ 01 \end{Bmatrix}, \begin{Bmatrix} 10 \\ 00 \end{Bmatrix}, \begin{Bmatrix} 11 \\ 10 \end{Bmatrix}, \begin{Bmatrix} 01 \\ 11 \end{Bmatrix}. \quad (6)$$

$$G_{21} = \begin{Bmatrix} 00 & 10 & 11 & 01 \\ 01 & , & 00 & , & 10 & , & 11 \end{Bmatrix}$$

Figure 5:
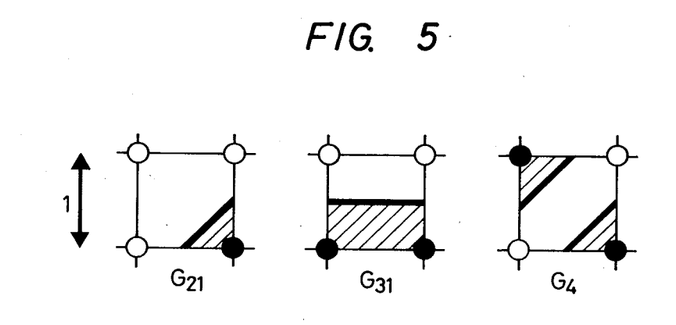
FIG. 5 is a diagram illustrating the method of calculating boundary length.

FIG. 5 shows a unit pattern of $$\begin{Bmatrix} 00 \\ 01 \end{Bmatrix}.$$

(3) Group $G_{22}$ of unit patterns having a lefthandedly slanted boundary line:
They are also composed of four kinds of unit patterns.

$$G_{22} = \begin{Bmatrix} 00 & 01 & 11 & 10 \\ 10 & , & 00 & , & 01 & , & 11 \end{Bmatrix} \quad (6)$$

(4) Group $G_{31}$ of unit patterns having a horizontal boundary line.

$$G_{31} = \begin{Bmatrix} 00 & 11 \\ 11 & , & 00 \end{Bmatrix} \quad (6)$$

FIG. 5 shows a unit pattern of $$\begin{Bmatrix} 00 \\ 11 \end{Bmatrix}.$$

(5) Group of $G_{32}$ of unit pattersn having a vertical boundary line.

$$G_{32} = \begin{Bmatrix} 01 & 10 \\ 01 & , & 10 \end{Bmatrix} \quad (6)$$

(6) Group of $G_4$ of unit patterns having a slated boundary line.

$$G_4 = \begin{Bmatrix} 01 & 10 \\ 10 & , & 01 \end{Bmatrix} \quad (6)$$

FIG. 5 shows a unit pattern of $$\begin{pmatrix} 10 \\ 01 \end{pmatrix}.$$

There are $(N-1)^2$ 2×2 unit patterns in N×N local images and they are classified into the above groups to obtain the frequency hk (k=1, 2, 3, 4). Where, $h_2$ is assumed to designate the sum of the frequencies obtained by scanning of the image $G_{21}$ and $G_{22}$, that is, the frequency of the slanted line, whereas $h_3$ the sum of the frequencies $G_{31}$ and $G_{32}$, that is, the frequencies of vertical and horizontal lines. The following equation is used to obtain a component ratio dk.

$$dk = hk/(N-1)^2 \tag{7}$$

$D = (d_1, d_2, d_3, d_4)$ is seen to form a characteristic vector representing an aspect of the properties of a local pattern having N×N picture elements.

Subsequently, a normalized boundary length C is obtained to express the complexity with a scalar quantity, the boundary length being the one obtained by converting the boundary length included in the local pattern having N×N picture elements to a unit patterns having 2×2 picture elements. Such a length can be obtained from the frequency of the unit pattern having 2×2 picture elements through approximation. FIG. 5 shows the boundary line contained in a region enclosed by four sampling or grid points. That is also the case with other unit patterns and, when the spacing of the grid points is given as 1, the groups $G_2$, $G_3$ and $G_4$ are expected to have lengths of $\sqrt{2}/2$, 1 and $\sqrt{2}$ respectively and approximately. Consequently, the normalized boundary length obtained by dividing the boundary length by the area can be computed according to the following equation:

$$C = (\sqrt{2}/2) d_2 + d_3 + \sqrt{2} d_4 \tag{8}$$

The characteristic vector D and the normalized boundary length C respectively reflect the complexity of each picture. These characteristics are also obtainable for the standard pattern candidate.

The following auxiliary evaluation functions as the requirement for the standard pattern which is defined using the aforementioned characteristic quantity.

(1) White pixel ratio:

50 is most suitable as the percentage $(W/N^2)$ of the number of white picture elements W within the standard pattern to the total number of elements therein and the decision is made with $|W/N^2 - 0.5| \leq \epsilon$ ($\epsilon$ is a predetermined value).

(2) Simple pattern ratio:

The decision is made with $\delta_1 \leq d_1 \leq \gamma_2$ using the first element of the characteristic vector of the standard pattern ($\delta_1$, $\delta_2$ are predeterminwed values).

In other words, those which are too simple or complex are excluded.

(3) Boundary length:

The decision is made with $\gamma_1 \leq C \leq \gamma_2$ ($\gamma_1$, $\gamma_2$ are predetermined values). This also has the same meaning as that of (2).

(4) Orthogonal element:

The following decision-making equations represent the boundary components perpendicular to each other within the standard pattern.

$(d_{21} \leq \theta)$ AND $(D_{22} \leq \theta)$ OR $(d_{31} \leq \theta)$ AND $(D_{32} \leq \theta)$ However, $\theta$ is a threshold and all four values of $\theta$ are assumed to be the same for the sake of brevity. They are intended to decide whether there exist horizontal and vertical edges or those slated in two directions. By this is meant that one standard pattern is usable for determining the optimum positions in both X and Y directions.

These auxiliary functions are related to the complexity of the standard pattern candidate. The candidates are thus screened and an optimum standard pattern should be selected from them using the evaluation function of the equation (4).

The number of standard patterns to be selected from the candidates has not been previously referred to in the foregoing discussion up to the present. When the local pattern matching is applied to an object ensuring that no rotary shifting is associated therewith, position detection is possible using one proper standard pattern. However, there is not provided means for conforming that erroneous matching has not occurred so that the problem is that such matching is not suitable for any application requiring high reliability. The use of a plurality of standard patterns will make it possible to detect erroneous matching by examining the interrelation between the positions obtained from two standard patterns and, if a spare standard pattern is prepared, high recognizability with redundancy can be accomplished. For that purpose, although a plurality of standard patterns are to be selected, the mutual positional relation poses a problem.

In local pattern matching using a plurality of standard patterns, the correction of revolution is made possible to a certain angular range through geometric calculations. However, two standard patterns must be separated from the picture plane to secure accuracy. When more than two standard patterns are prepared to provide redundancy, any two of them must also be separated. In case no correction of revolution is required, the above condition need not to be satisfied.

As a method for choosing the predetermined number of standard patterns satisfying the arrangement requirements while priority is given to what has a greater function Ecm for determining whether a pattern is unique, application is made to what adopts highly evaluated patterns successively while checking the distance between them one by one. The shortest mutual distance is assured in this method. Subsequently, the algorithm will be described.

(i) A standard pattern candidate with the greatest Ecm is adopted and registered.

(ii) A standard pattern candidate with the greatest Ecm among those left over is taken and examination is made to check whether the distances between this one and what have already been registered are all larger than the predetermined shortest distance. If the result is satisfactory, it will be stored and otherwise discarded.

(iii) The process in step (ii) is repeated until the required number of patterns has been stored.

The basic operation according to the present invention has been described. Now an apparatus for implementing the above-described method will subsequently be described.

After standard patterns are prepared, recognition is generally executed a number of times and therefore time for recognition is required to be as short as possible. However, time requirements for the preparation of standard patterns are not so severe. Accordingly, the simplest method for realizing the present invention comprises storing an input image including the image of an object intended for recognition in an image memory and allowing a computer to read data stored in any position of the image memory. In so doing, the whole process for preparing the aforementioned standard pattern can be carried out on the computer automatically.

Figure 1:
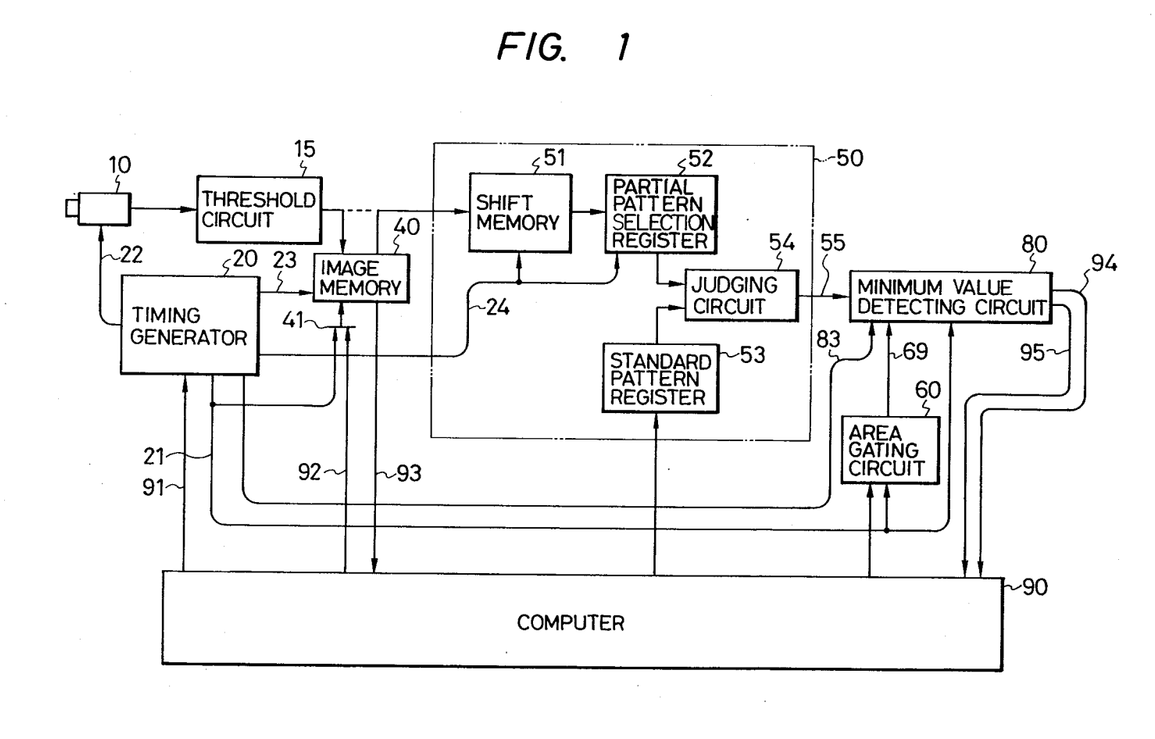
FIG. 1 is a block diagram of an apparatus embodying the present invention.

However, since the calculation of the matching error will generally require a considerable length of time on the part of a computer, it is preferred to use the matching circuit already provided for recognition. FIG. 1 shows an arrangement of the apparatus for the purpose. In FIG. 1, the arrangement include a pickup device 10 such as a television camera operating, together with an optical system and an apparatus for supplying and fixing an object, to obtain an image of the object; a circuit 15 for receiving a signal from the pickup device, comparing the signal with a threshold and converting it into a binary value; a timing generator 20 for generating a timing signal directed to the pickup device and a matching circuit, that is, forming a signal 21 indicating scanning coordinates (X, Y) corresponding to the picture plane being scanned with the pickup device from a basic clock and generating a horizontal and vertical synchronizing signal 22 required by the pickup device in each period of X, Y. When an image pickup command 91 is given by a computer 90, a write signal 23 corresponding to just one picture plane is sent to the image memory 40, whereby the image is selected and stored. The address of the image memory 40 at that time is so arranged as to direct an address switching circuit 41 to a scanning coordinate signal 21. After the image has selected and stored, image data 93 in coordinates can be read out of the computer 90 by switching the address selector 41 over to an address signal 92 from the computer 90. Accordingly, a local pattern as a standard pattern candidate can be obtained through the above method and the calculation of an auxiliary evaluation function for the aforementioned primary selection can also be carried out in the computer. As for a minimum non-native position Ecm as the principal evaluation function, a high-speed special matching circuit 50 for use at the time of recognition is used.

The special matching circuit 50, which has already been disclosed in detail in Japanese Pat. Appln. Laid-Open Nos. 49-111665, 52-91331 and 53-134330, will be described briefly in this specification. When the output of the binary circuit 15 is directly supplied (as shown by a broken line in FIG. 1) or the output read out of the image memory 40 is supplied to the matching circuit, the output is first given to N−1 series shift memory 51. The length of each shift memory, that is, the number of stages thereof is set equal to the number of picture elements fed each time horizontal scanning is carried out. Accordingly, N signals comprise the input and the outputs of N−1 shift memories mutually correspond to picture elements which are one horizontal scanning apart from each other. These N signals are applied to a parallel partial pattern selection register 52. The register comprises shift registers, each being in the stage of N of N series inputs and parallel outputs, whereby N×N parallel outputs are ultimately obtainable and correspond to local patterns arranged two-dimensionally within the picture plane. As the shift memory 51, together with the parallel partial pattern selection register 52, is shifted by one stage each time the input of the clock 24 is given, the local pattern corresponding to the output of the parallel partial pattern selection register moves within the picture plane simultaneously as the timing generator 20 scans a portion equivalent to one picture plane. The contents of a standard pattern register 53 having the same N×N parallel outputs are set by the computer 90. When a standard pattern is prepared, a standard pattern candidate is set. The outputs of the two registers 52, 53 are applied to a pattern judging circuit 54, in which the corresponding output signals of the partial pattern cut out register 52 and the standard pattern selection register 53 are combined and examined to detection inequality. An exclusive OR circuit may be used for the purpose. Then an output of 1 is obtained when a mismatch occurs. The signal 55 corresponds to the matching error of the equation (2).

Figure 2:
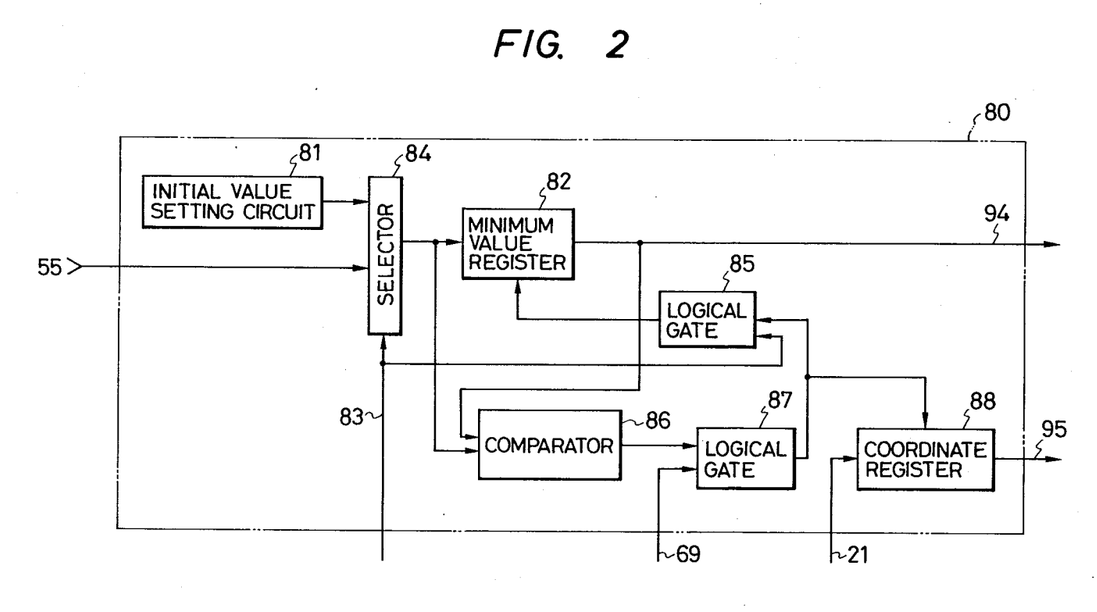
FIG. 2 is a block diagram of the minimum value detecting circuit of FIG. 1.

A minimum value detecting circuit 80 is used to obtain the minimum value shown by the equation (3) against the matching error signal. Referring to FIG. 2, the detail of that process will be described. An initial value setting circuit 81 gives a large number as an initial value to a minimum value register. A selector 84 is switched to actuate the initial value setting circuit with initializing signal 83 sent prior to the commencement of the search for the minimum value and to set the minimum value register 82 through a logical circuit 85. The selector 84 operates to activate the matching error signal 55, to compare the matching error with the value in the minimum register 82 at that point of time with a comparator 86 so as to produce an output, provided that the matching error is smaller than the value in the minimum register. After the output has been gated by a logical gate 87 at the comparator clock 69 rate, it passes through the logical gate 85 and acts so as to set the minimum value register. As a result, the minimum value will have been obtained at the minimum value register 82 by the time that scanning is completed and the value is taken into the computer as a signal 94, whereby it can be read out. Moreover, because an output pulse of the logical gate 87 is produced each time the minimum value is renewed, if the scanning coordinate signal 21 is applied to the matching coordinate register 88 and scanning coordinates are set at the register 88 by means of the output pulse of the logical gate 87, the scanning coordinates at the time of the last renewal, that is, the generation of the minimum value, will remain at the register 88, so that it may be taken into the computer as a signal 95 and read out of the computer.

Figure 3:
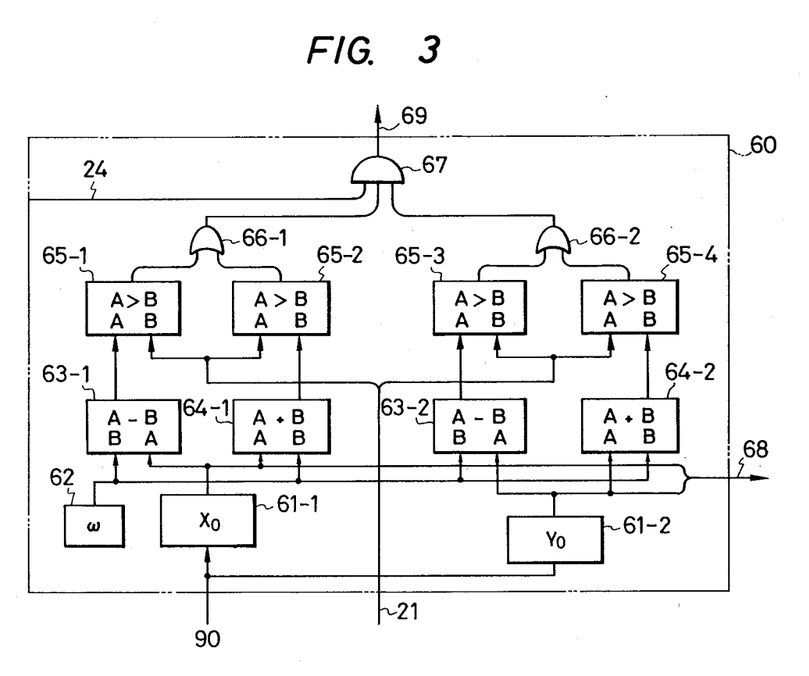
FIG. 3 is a block diagram of the region limiting circuit of FIG. 1.

Since it is only necessary to obtain the minimum value within the whole scanning range at the time of recognition, the comparator clock 69 may always be activated. However, when a minimum non-native position error is obtained for a standard pattern candidate, the minimum value must be obtained in the only area represented by the equation (5). An area gating circuit 60 limits the area and produces a comparator clock pulse only for that area. Referring to FIG. 3, the process will be described in detail.

An Xo register 61-1, a Yo register 61-2 are set by the computer and a constant number register expresses $\omega$ of the equation (5). Additions and subtractions are carried out against these registers values, A subtractor 63-1 is operated to calculate $X_o - \omega$, an adder 61-1 $X_o + \omega$, a subtractor 63-2 Yo−ω and an adder 64-2 Yo−ω. These values are compared with scanning coordinates X, Y. As the output of a comparator 65-1 and that of a comparator 65-2 are set at "1" respectively when X<Xo−ω and X>Xo+ω, it is only when |X−Xo|>ω that the output of an OR circuit 66-1 becomes 1. In the same manner, as the outputs of comparator 66-1, 66-2 are set at "1" respectively when Y<Yo−ω and Y>Yo+ω, it is only when |Y−Yo|>ω that the output of an OR circuit 66-2 becomes 1. Ultimately, the comparator clock 69 satisfying the conditions X, Y and being produced at the timing of the clock 24 is provided and output.

The use of the apparatus thus describes makes it possible to select a local pattern out of the image memory under control of the computer 9, send it as a standard pattern candidate to the matching circuit 50, implement the calculation of the minimum value non-native position error expressed by the equations (4) and (5) using a special high-speed circuit and read out the minimum value as the signal 94. Accordingly, high-speed processing becomes feasible.

Moreover, this apparatus may be modified by adding a circuit related to the area gating circuit 60 and the image memory 40 to the position detecting apparatus proposed by Japanese Pat. Appln. Laid-Open No. 52-91331 and replacing the program for the computer 90 with the least cost increase.

Figure 4:
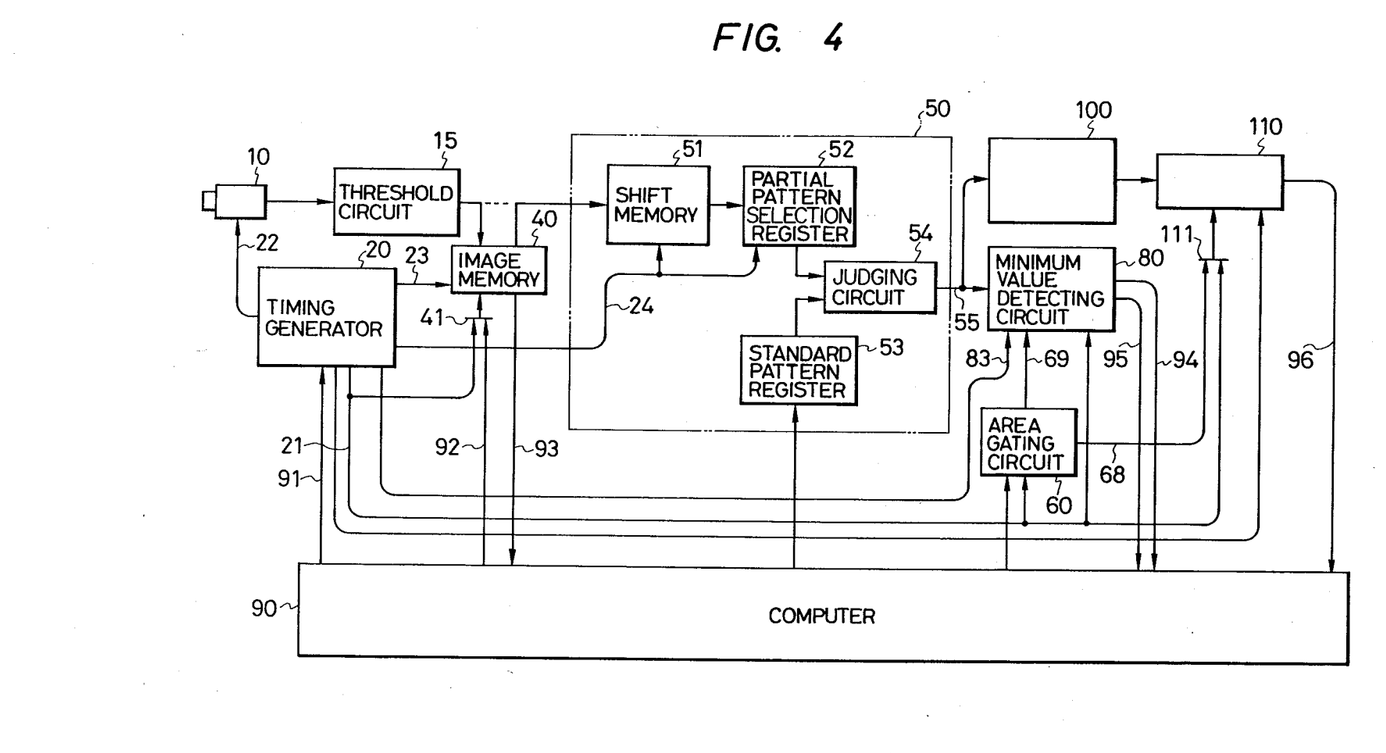
FIG. 4 is a block diagram of another apparatus embodying the present invention with an additional circuit for increasing processing speed.

FIG. 4 shows an example of a circuit for computing the white pixel ratio within the primary selecting function at high speed. Since this circuit is added to what is shown in FIG. 1, the description of like parts will be omitted.

When the white pixel ratio is obtained, a standard pattern all in black is set at the standard register. Then the white picture element within the local pattern appears at the parallel partial pattern cut-out registers 52 becomes a mismatch, whereas the number W of white picture elements of the local pattern is obtained at the output 55 of the judging circuit 50. Accordingly, it is so arranged that a judging output "1" is produced only when the value at a range judging circuit 100 is more than $(0.5-\epsilon)N^2$ and less than $(0.5+\epsilon)N^2$. The judging output is written to a local pattern selecting bit memory or selecting memory 110 for short. At this time, an address selector 111 of the selecting memory is making contact with the scanning coorinate signal 21 and the position within the picture plane of the local pattern is supplied as an address. However, the scanning coordinates are supplied at the timing of the last point of the local pattern and located at the lower right corner with box X, Y being inreased by N/2 off the center.

The following procedure applies when preliminary selection of a local pattern is made depending on the contents of the selecting memory 110 to judge the matching error. The position of a local pattern candidate is generated in the same order as that of picture plane scanning. The position of the local pattern at that time is not located at the center but produced as that of a picture element at the lower right corner. The positional coordinates are sent to the Xo, Yo register 61 of the area gating circuit 60. The value of the register is sent out as a signal 68 and given as the address of the selecting memory 110 through the address selector 111. Accordingly, the result of the preliminary selection written to the selecting memory, that is, a proper white pixel ratio "1" according to the present example is obtained and read by the computer through a readout line 96. In case the data is "0" and unsuitable, the next local pattern candidate is picked up and its positional coordinates should be sent to the Xo, Yo register 61. The local pattern is not read from the image memory 40 until the data of the selecting memory 110 becomes "1" and, if necessary, another primary selecting function is used to determine its suitability. After that process has been repeated to filter the local pattern, it is justified as a local pattern candidate before being sent to the standard pattern register 53 to obtain the minimum value of the matching error. Since the area gating circuit 100 used in this case can simply be arranged with two numerical value comparators and an AND circuit, detailed description will be omitted.

It is preferred to store the minimum value of the matching error together with its coordinates in the computer 90 and, after the local patterns in all positions have been examined, select the greatest one among the minimum values of the matching errors stored in the memory of the computer in the aforementioned manner.

As it is possible according to the present invention to select a standard pattern or a combination of standard patterns fit for pattern matching automatically out of the picture plane of a television camera, the subsequent recognition of new kinds of objects is readily prepared only by supplying such new kinds of objects of the view of the television camera and starting the process of selection. Accordingly, the careful operation of selection relying on human intuition for selecting standard patterns is unnecessary and such operation is implemented readily and simply by unskilled persons. Moreover, the time required for such selection is shortened as a result of the addition of a small scale circuit to a matching circuit and also minimizable particularly when a plurality of standard are selected.

What is claimed is:

1. A method of producing a standard pattern comprising: successively selecting and storing in a memory of plurality of local patterns different in position and equal in size to a standard pattern to be obtained from an image of an object being examined; obtaining a distribution of pattern detail in picture elements constituting each local pattern; and chosing a standard pattern from said plurality of local patterns which has a distribution of pattern detail in picture elements most closely in conformity with a predetermined distribution of pattern detail.

2. A method of producing a standard pattern as claimed in claim 1, wherein, when the picture elements have binary values, a determination is made whether or not a number of picture elements having either of two binary values among the picture elements constituting each local pattern satisfies predetermined conditions.

3. A method of producing a standard pattern as claimed in claim 2, wherein said predetermined conditions of the number of picture elements conditions are such that a number of picture elements having either binary value is about half a total of picture elements of said local patterns.

4. A method of producing a standard pattern as claimed in claim 2, wherein a determination is made whether or not boundary lengths included in said local patterns being in conformity with said predetermined conditions are within a predetermined range and standard patterns are obtained from said local patterns within said predetermined range.

5. A method of production of a standard pattern in accordance with claim 1 further comprising the steps:

(a) inputting the image of the object and storing the image in the memory;

(b) loading in a memory a local pattern and making the local pattern a standard pattern candidate;

(c) obtaining a value of minimum matching errors between said standard pattern candidate and each of one or more other local patterns, each of the one or more other local patterns being obtained from a different part of the image than from where the local pattern was selected which was made a standard pattern candidate and being equal in size to said standard pattern candidate;

(d) repeating said steps (b) and (c) for said stored image to generate one or more additional standard pattern candidates and to obtain a number of matching errors for each of the one or more additional local pattern candidates; and (e) selecting the standard pattern from the standard pattern candidates based upon which of the standard pattern candidates has a largest value of minimum matching errors obtained for each standard pattern candidate.

6. A method of production of a standard pattern comprising the steps:

inputting an image of an object and storing the image;

successively selecting and storing in a memory a plurality of local patterns equal in size to a standard pattern to be produced from said stored image and making each local pattern a standard pattern candidate;

obtaining a value of minimum matching errors between each of said standard pattern candidates and each of one or more additional local patterns, each of the one or more additional local patterns being obtained from a different part of the image than from where the local patterns were selected, and being equal in size to said standard pattern candidates from within said image;

selecting the standard pattern from the standard pattern candidates based upon which of the standard pattern candidates has a largest value of minimum matching errors obtained for each standard pattern candidate;

the plurality of said standard pattern candidates being selected from a plurality of local patterns successively selected from the stored image screened by a judgement that said standard pattern candidates are appropriate as a standard pattern based on data in only said local patterns from which said standard pattern candidates are made; and wherein said appropriateness of each of said standard pattern candidates is determined by whether or not a distribution of standard pattern detail in picture elements constituting said standard pattern is most closely in conformity with a predetermined distribution of pattern detail.

7. A method of producing a standard pattern as claimed in claim 6, wherein the image is in the form of binary values and said appropriateness of said pattern candidates is determined by whether or not the number of picture elements having predetermined values among picture elements constituting said plurality of local patterns successively selected and stored in the memory is within a predetermined range.

8. A method of producing a standard pattern as claimed in claim 6, wherein said appropriateness of said standard pattern candidates is determined by whether or not boundary lines in directions perpendicular to each other exist in said standard pattern candidates.

9. A method of producing a standard pattern as claimed in claim 6, wherein said appropriateness of said pattern candidates is determined by obtaining a number of unit patterns in which four picture elements have a same value among unit payttersn having a $2 \times 2$ matrix of picture elements in said standard pattern candidates, and being determined by whether the number of unit patterns in which four picture elements have a same value is within a predetermined range.

* * * * *